(12) United States Patent
Trostle

(10) Patent No.: US 7,644,439 B2
(45) Date of Patent: Jan. 5, 2010

(54) TIMING ATTACKS AGAINST USER LOGON AND NETWORK I/O

(75) Inventor: Jonathan T. Trostle, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 816 days.

(21) Appl. No.: 10/937,079

(22) Filed: Sep. 8, 2004

(65) Prior Publication Data

US 2005/0044390 A1 Feb. 24, 2005

Related U.S. Application Data

(62) Division of application No. 09/304,243, filed on May 3, 1999, now abandoned.

(51) Int. Cl.
G06F 12/14 (2006.01)
(52) U.S. Cl. .......................... 726/23; 726/22; 713/188; 380/263
(58) Field of Classification Search ............. 726/22–25, 726/2; 713/188, 163; 380/263
See application file for complete search history.

(56) References Cited

U.S. PATENT DOCUMENTS

| | | | | |
|---|---|---|---|---|
| 4,885,789 A | * | 12/1989 | Burger et al. ................ 713/164 |
| 4,918,653 A | * | 4/1990 | Johri et al. .................... 726/23 |
| 5,003,595 A | | 3/1991 | Collins et al. ................. 380/25 |
| 5,163,147 A | | 11/1992 | Orita ........................... 395/600 |
| 5,241,594 A | | 8/1993 | Kung ............................. 380/4 |
| 5,241,599 A | | 8/1993 | Bellovin et al. ............... 380/21 |
| 5,278,901 A | * | 1/1994 | Shieh et al. ................... 726/22 |
| 5,351,136 A | | 9/1994 | Wu et al. ..................... 358/440 |
| 5,416,842 A | | 5/1995 | Aziz ............................ 380/30 |
| 5,421,006 A | | 5/1995 | Jablon et al. ................. 395/575 |
| 5,440,635 A | | 8/1995 | Bellovin et al. ............... 380/25 |
| 5,649,095 A | * | 7/1997 | Cozza .......................... 714/39 |
| 5,655,077 A | | 8/1997 | Jones et al. ............. 395/187.01 |
| 5,671,354 A | | 9/1997 | Ito et al. ................. 395/187.01 |
| 5,680,461 A | | 10/1997 | McManis ..................... 380/25 |

(Continued)

FOREIGN PATENT DOCUMENTS

WO 99/53408 10/1999

(Continued)

OTHER PUBLICATIONS

Trostle, J. T., Timing Attacks Against Trusted Path, May 3-6, 1998, 1998 IEEE Symposium on Security and Privacy [pp. 125-134].*

(Continued)

Primary Examiner—Michael J Simitoski
Assistant Examiner—Amare Tabor
(74) Attorney, Agent, or Firm—BainwoodHuang

(57) ABSTRACT

In a first aspect of the invention, method for classifying characters within a character string entered via a keyboard device includes logging interrupts, checking a time between interrupts, checking an interrupt duration and classifying the characters within the character string based upon the time between interrupts and the interrupt duration. In a second aspect of the invention, a method for protecting against timing attacks against a trusted path mechanism includes employing a multithreaded process with a first thread to prevent any timing Trojan horses from running, running the first thread in a loop at a first priority and preventing unprivileged processes from obtaining a priority higher than the first priority.

18 Claims, 7 Drawing Sheets

U.S. PATENT DOCUMENTS

| | | | | |
|---|---|---|---|---|
| 5,684,950 | A | 11/1997 | Dare et al. | 395/187.01 |
| 5,708,780 | A | 1/1998 | Levergood et al. | 395/200.12 |
| 5,764,772 | A | 6/1998 | Kaufman et al. | 380/30 |
| 5,815,665 | A | 9/1998 | Teper et al. | 395/200.59 |
| 5,835,727 | A | 11/1998 | Wong et al. | 395/200.68 |
| 5,845,070 | A | 12/1998 | Ikudome | 395/187.01 |
| 5,898,780 | A | 4/1999 | Liu et al. | 380/25 |
| 5,944,824 | A | 8/1999 | He | 713/201 |
| 5,987,232 | A | 11/1999 | Tabuki | 395/187.01 |
| 5,991,810 | A | 11/1999 | Shapiro et al. | 709/229 |
| 6,006,328 | A * | 12/1999 | Drake | 726/23 |
| 6,006,334 | A | 12/1999 | Nguyen et al. | 713/202 |
| 6,011,910 | A | 1/2000 | Chau et al. | 395/200.59 |
| 6,021,496 | A | 2/2000 | Dutcher et al. | 713/202 |
| 6,044,155 | A | 3/2000 | Thomlinson et al. | 380/49 |
| 6,047,376 | A | 4/2000 | Hosoe | 713/201 |
| 6,058,466 | A * | 5/2000 | Panwar et al. | 712/15 |
| 6,092,196 | A | 7/2000 | Reiche | 713/200 |
| 6,141,687 | A | 10/2000 | Blair | 709/225 |
| 6,195,676 | B1 * | 2/2001 | Spix et al. | 718/107 |
| 6,212,544 | B1 * | 4/2001 | Borkenhagen et al. | 718/103 |
| 6,223,204 | B1 * | 4/2001 | Tucker | 718/103 |
| 6,542,921 | B1 * | 4/2003 | Sager | 718/108 |
| 6,748,534 | B1 * | 6/2004 | Gryaznov et al. | 713/188 |
| 6,763,467 | B1 * | 7/2004 | Radatti et al. | 726/24 |
| 6,928,647 | B2 * | 8/2005 | Sager | 718/108 |
| 7,275,246 | B1 * | 9/2007 | Yates et al. | 718/100 |
| 2002/0032850 | A1 * | 3/2002 | Kauffman | 712/31 |
| 2002/0184290 | A1 * | 12/2002 | Olszewski et al. | 709/102 |
| 2003/0149897 | A1 * | 8/2003 | Ylitalo et al. | 713/201 |
| 2005/0120238 | A1 * | 6/2005 | Choi | 713/200 |

OTHER PUBLICATIONS

Bellare et al., "Keying Hash Functions for Message Authentication", 1996, Advances in Cryptology-Crypto 96 Proceedings, Lecture Notes in Computer Science, vol. 1109, N. Koblitz ed., Springer-Verlag.

Bellovin, Steven M., "Problem Areas for the IP Security Protocols", Jul. 22-25, 1996, Proceedings of the Sixth Usenix UNIX Security Symposium, San Jose, CA.

Krawczyk, Hugo, "SKEME: A Versatile Secure Key Exchange Mechanism for Internet", 1996, IEEE, Proceedings of the 1996 Symposium on Network and Distributed Systems Security.

Ascend Remote Access Network Security, Ascend Communications, Inc., 1998. Retrieved from the Internet: <URL:http://www.ascend.com/1103.html>, 8 pages.

* cited by examiner

TIMING ATTACKS AGAINST USER LOGON AND NETWORK I/O

CROSS REFERENCE TO RELATED APPLICATIONS

This application is a divisional of U.S. patent application Ser. No. 09/304,243, entitled "Timing Attacks Against User Login And Network I/O," filed on May 3, 1999, which is now abandoned, in the name of the same inventor and assigned to the same assignee.

BACKGROUND OF THE INVENTION

1. Field of the Invention

The present invention relates to computer security. More particularly, the present invention relates to timing attacks against user logon and network I/O.

2. Background

Network security solutions have often focused on cryptographic protocols, their security properties, and key management for these protocols. Another important area to consider with respect to network security is the security of user host systems or workstations. If the user system security is weak, then the user's network identity can be stolen by an attacker, or used in ways not intended by the user. If the user is an administrator, then the attacker may be able to compromise the data of many network users.

A Trojan horse is a program routine that invades a computer system by being secretly attached to a valid program that will be downloaded into the computer. It may be used to locate password information, or it may alter an existing program to make it easier to gain access to it. Typically, a Trojan horse runs with the identity and all the rights of the user. A virus is a Trojan horse that continues to infect programs over and over.

With the advent of the World Wide Web (WWW) and Java, an attacker has many opportunities to push Trojan horses down to the user's desktop system. WWW browsers invoke helper applications that are potential Trojan horse processes. For example, the Felten-Balfanz attack can be used to launch a Word macro virus on a client host if the user visits the attacker's web page. Mail programs with attachments can also lead to a Trojan horse running on the user's system. Java applets may be Trojan horses. Push technology is likely to increase the ability of an attacker to target a particular user.

User systems that are Trojan horse non-persistent are less vulnerable to attacks. A user system is Trojan horse non-persistent if a downloaded Trojan horse process cannot survive a reboot. More specifically, a user system is Trojan horse non-persistent if:

1. A downloaded Trojan horse program cannot arrange to have itself restarted by the operating system after reboot, and
2. A downloaded Trojan horse program cannot arrange to be invoked when the user invokes a program from his/her normal set of programs assuming the downloaded program has not been added to the normal set of user programs by either the user or an administrator.

Windows 95 is an example of a user system that is not Trojan horse non-persistent, since this host would fail both (1) and (2) above. On a Windows 95 system, a downloaded Trojan horse can arrange to restart itself on an operating system reboot. A Trojan horse can also infect any program in the user's normal set of programs. These facts are a consequence of the lack of access control in Windows 95.

UNIX and Windows NT operating systems are potentially Trojan horse non-persistent, but in practice, many of these systems do not have this property. For example, on many UNIX hosts, the user PATH environment variable is writable by the user. Thus, a downloaded Trojan horse can reorder the list of directories to be searched on invocation of an executable specified by a relative file name. The result can be that the user executes a Trojan horse program instead of the mail program from his/her normal set of programs. Note that Windows NT and UNIX are designed to have property (1) above; a failure to have this property is typically a result of complete system penetration (the attacker becoming superuser or administrator).

On Windows NT systems, the user profile contains files that contain the names of executables that are invoked when the user selects the corresponding desktop icons with the mouse. These files are often configured as writable by the owning user. Therefore, a downloaded Trojan horse could rewrite a link in one of these files so that the user invokes a Trojan horse browser instead of his/her normal browser, violating property (2) above.

The above scenarios on Windows NT and UNIX are a result of the fact that the administration load is lightened if the user is allowed to do some administration himself/herself. For example, a UNIX user may need to add a directory to his/her path in order to run a certain program. If he/she can change the PATH environment variable, then the administrator is saved from having to do it The UNIX "setuid" command assigns the identity and all associated rights of a user to a process. The lack of adequate access control is complicated by the fact that a setuid mechanism solution is vulnerable to the case where a Trojan horse invokes the setuid program. An improvement is possible by making the privileges of each process equal to the intersection of the ones associated with the executable file and the process's parent process (as in UNIX System V, Release 4.1); the PATH file change utility would therefore be able to modify the PATH file and other user processes would be unable to spawn this process or modify the PATH file themselves. Another improvement is possible by making the PATH file change utility setuid to a non-human user that has the needed privilege to invoke the trusted path mechanism. The trusted path mechanism then acts as a go-between between the user and the change utility (the change utility uses it as the user interface).

Typically, the UNIX setuid mechanism allows for more fine-grained access control on the UNIX operating system than what is available on Windows NT. A weakness of Windows NT is that all processes belonging to a user run with the same privileges and access rights.

Many commercial UNIX systems also have the following additional weakness with respect to downloaded Trojan horses. A downloaded Trojan horse can make the necessary system calls to become a daemon process (such as setpgrp) and continue to run unattended after the user has logged out Such a process runs until the system is rebooted.

The term "Trusted path" refers to a secure trusted communication path between a user and trusted software on the user's system. A system with a trusted path mechanism ensures that the user password is not handed directly to a Trojan horse. The TCSEC (Orange Book) defines the concept of trusted path at the B2 level. *Department of Defense Trusted Computer System Evaluation Criteria*, DOD 5200.28-STD. Fort Meade, Md. National Computer Security Center, December 1985. For B2 trusted path, the user must be able to involve a trusted path between himself and the operating system kernel at login time. Thus, the user can ensure that he/she is not being spoofed by a password gathering Trojan horse, and that the password is not being handled by untrusted software between keyboard entry and the kernel.

The Windows NT operating system has the B2 trusted path property that is invoked with the control-alt-delete keys. Trusted path is also invoked when locking and unlocking the workstation. UNIX System V Release 4.1 is designed with the trusted path feature, but many of the commercially popular UNIX operating systems do not have the trusted path feature.

On UNIX systems without the trusted path mechanism, the "su" command is vulnerable to attack. The X windows user interface is easily spoofed. For instance, a Trojan horse might be programmed to act like the X windows lockscreen program in an attempt to gather passwords. Thus a Trojan horse on such a system can obtain the root password, even if the system is Trojan horse non-persistent UNIX systems without trusted path do have the equivalent of the trusted path mechanism, but only under a limited set of circumstances. Here, the user only enters his/her logon password during the initial logon sequence and the user does not use the "su" command. Since the logon password is entered only once, the user does not use the X windows lockscreen feature.

Typically, commercial client operating systems lack the fine grain access control necessary to protect against Trojan horse attacks. These systems fail to adequately manage permissions for logging onto system and/or making modifications to the computer user environment, making the systems susceptible to attack. Even systems employing the "trusted path" concept are vulnerable to attack. Accordingly, a need exists in the prior art for a method for protecting against Trojan horse attacks against computer operating systems employing a trusted path mechanism.

BRIEF DESCRIPTION OF THE INVENTION

In a first aspect of the invention, method for classifying characters within a character string entered via a keyboard device includes logging interrupts, checking a time between interrupts, checking an interrupt duration and classifying the characters within the character string based upon the time between interrupts and the interrupt duration. In a second aspect of the invention, a method for protecting against timing attacks against a trusted path mechanism includes employing a multithreaded process with a first thread to prevent any timing Trojan horses from running, running the first thread in a loop at a first priority and preventing unprivileged processes from obtaining a priority higher than the first priority.

DETAILED DESCRIPTION OF THE PREFERRED EMBODIMENTS

Figure 1A:
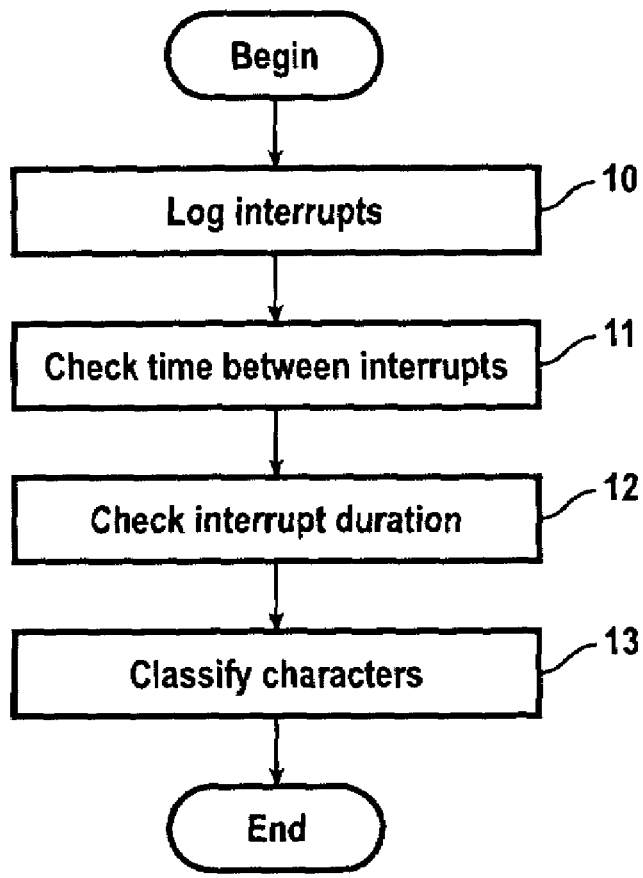
FIG. 1A is a flow diagram that illustrates a method for classifying characters within a character string in accordance with the present invention.

Those of ordinary skill in the art will realize that the following description of the present invention is illustrative only. Other embodiments of the invention will readily suggest themselves to such skilled persons having the benefit of this disclosure.

This invention relates to computer security. More particularly, the present invention relates to a method for protecting against timing attacks against user logon and network I/O. The invention further relates to machine readable media on which are stored (1) the layout parameters of the present invention and/or (2) program instructions for using the present invention in performing operations on a computer. Such media includes by way of example magnetic tape, magnetic disks, optically readable media such as CD ROMs and semiconductor memory such as PCMCIA cards. The medium may also take the form of a portable item such as a small disk, diskette or cassette. The medium may also take the form of a larger or immobile item such as a hard disk drive or a computer RAM.

According to the present invention, the size of the user key space is reduced through the use of timing. More specifically, a Trojan horse obtains information about a character string such as a password by monitoring the timing of interrupts related to keyboard entry. Also, computer systems employing an improved trusted path mechanism according to the present invention are protected against timing attacks.

Timing attacks against the trusted path mechanism according to the present invention are now described. Note that if the user host does not have the trusted path mechanism, there are easier methods of obtaining the user password. Also, if the user password is not chosen according to a strong password policy, it will be vulnerable to dictionary attacks and the attacker can proceed directly to dictionary attacks on the user authentication protocol.

The outline of the attack is as follows: The Trojan horse process executes in a loop and checks a clock periodically. Character input by a user at the keyboard causes interrupt processing to take place that is distinguishable from when the user is not typing. The interrupts attributable to character input are distinguished by the interrupt duration and the time between interrupts.

The attack may be illustrated with respect to a test workstation of an IBM PC design running the X11 windowing system. On this workstation, a keystroke causes two interrupts. The second interrupt follows the first interrupt by roughly 80 to 140 milliseconds. This pattern makes keystrokes relatively easy to identify. Table 1 shows a run of an attack program with no keystrokes. Table 2 shows a run of the same attack program while the user is typing the password "rpo" to unlock the workstation (along with an initial return and a final return after the password) and one character after the unlock. As an example, the second line of Table 1 is interpreted to mean there have been no keyboard interrupts for the five second interval preceding the current keyboard interrupt which has a duration of eighty μsec. This interval indicates that there are no password keystrokes currently being entered by the user (users type more quickly).

TABLE 1

| Time Between Interrupts (μsec) | Interrupt Duration (μsec) |
| --- | --- |
| 4,516,776 | 96 |
| 5,009,984 | 80 |
| 5,010,005 | 76 |
| 5,010,011 | 97 |
| 5,009,976 | 78 |
| 5,010,016 | 82 |

TABLE 2

| Time Between Interrupts (μsec) | Interrupt Duration (μsec) |
| --- | --- |
| 8,707,187 | 78 |
| 5,010,019 | 87 |
| 46,836 | 89 |
| 96,923 | 77 |
| 1,656,052 | 83 |
| 98,548 | 85 |
| 1,506,022 | 83 |
| 111,259 | 81 |
| 1,484,579 | 83 |
| 98,543 | 82 |
| 1,626,417 | 80 |
| 96,942 | 81 |
| 3,197,124 | 82 |
| 1,375,724 | 94 |
| 100,349 | 83 |
| 3,533,748 | 77 |
| 5,009,999 | 77 |
| 5,010,015 | 75 |

Turning now to FIG. 1A, a method for classifying characters within a character string is presented. At reference numeral 10, interrupts are logged. At reference numeral 11, the time between interrupts is checked. At reference numeral 12, the interrupt duration is checked. At reference numeral 13, the characters within the character string are classified based upon the time between interrupts and the duration of the interrupts. The order of reference numerals 11 and 12 with respect to each other is not important. Both 11 and 12 must be done at some point after reference numeral 10 and before reference numeral 13.

Figure 1B:
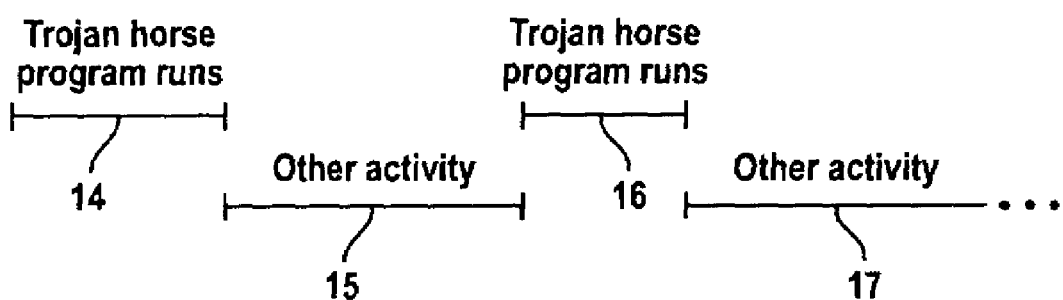
FIG. 1B is a timing diagram illustrating interrupt logging in accordance with the present invention.

Turning now to FIG. 1B, a timing diagram illustrating interrupt logging is presented. This corresponds to reference numeral 10 of FIG. 1A. Trojan horse execution periods are represented by reference numerals 14 and 16. Execution periods 14 and 16 represent the time that the Trojan horse program runs without being scheduled out. Other execution periods are represented by reference numerals 15 and 17. Execution periods 15 and 17 typically represent CPU usage by interrupts and other processes or threads. The CPU usage by interrupts may be caused by character entry from a keyboard. The Trojan horse program records the duration of execution periods 14, 15, 16 and 17 and uses this timing information to obtain more information about the characters being processed.

The First Timing Attack

According to one embodiment of the present invention, the length of a character string is obtained by monitoring the timing relationship between interrupts generated. More than one trial may be required to obtain the information. By determining which characters of a password are shift characters, the bit strength of the password is reduced by the length of the password.

In another embodiment of the present invention, an indication of which of the characters are upper case is obtained by monitoring the timing relationship between interrupts generated. When typing an upper case character, the shift character is usually held down slightly longer, since it is difficult to press both keys at exactly the same time (as opposed to holding down the other key longer which produces undesirable results). The result is that multiple interrupts are generated that are often separated from each other by thirty milliseconds. A typical run with an upper case character is shown in Table 3; the password "pPo" is typed by the user (along with an initial return and a final return). Lines 9-11 of Table 3 indicate that the second character is an upper case character.

TABLE 3

| Time Between Interrupts (μsec) | Interrupt Duration (μsec) |
| --- | --- |
| 5,786,712 | 92 |
| 5,009,992 | 83 |
| 716,429 | 97 |
| 80,969 | 80 |
| 1.672,653 | 82 |
| 104,639 | 79 |
| 2,726,038 | 93 |
| 250,271 | 83 |
| 31,853 | 81 |
| 31,872 | 81 |
| 30,975 | 77 |
| 6,692 | 82 |
| 124,546 | 81 |
| 192,143 | 87 |
| 2,218,518 | 82 |
| 102,804 | 83 |
| 1,322,675 | 82 |
| 92,018 | 80 |

TABLE 4

| Password Length (characters) | Bits | Bits After Attack |
| --- | --- | --- |
| 10 | 65 | 55 |
| 9 | 58.5 | 50 |
| 8 | 52 | 44 |
| 7 | 45.5 | 38.5 |

Table 4 gives some key strengths in bits that result from different password lengths (in characters). The second column shows the resulting bit strength of the password where 6.5 bits per password character are assumed, and the third column shows the bit strength of the password after the first timing attack. Six and one half bits per character are used since it is assumed that a password policy is being used (thus the passwords are not from a dictionary), and it is assumed that the password characters are uniformly distributed from a 94 character alphabet consisting of 0-9, a-z, ',-,=,[,].;',./, and, as well as the corresponding upper case letters.

Thus, when this timing attack is possible, a few trials quickly lead to a significant reduction in the user password key strength: A ten character password is reduced to 55 bits of strength, a nine character password is reduced to 50 bits of strength, an eight character password is reduced to 44 bits of strength, and a seven character password is reduced to 38.5 bits of strength. These reductions are achieved since the knowledge of whether the shift key is used for each character reduces the character alphabet in half; thus one bit of information is obtained for each character in the password. For a ten-character password, ten bits of information are obtained, thus reducing the strength down from 65 bits (10 times 6.5 bits) to 55 bits.

Figure 2:
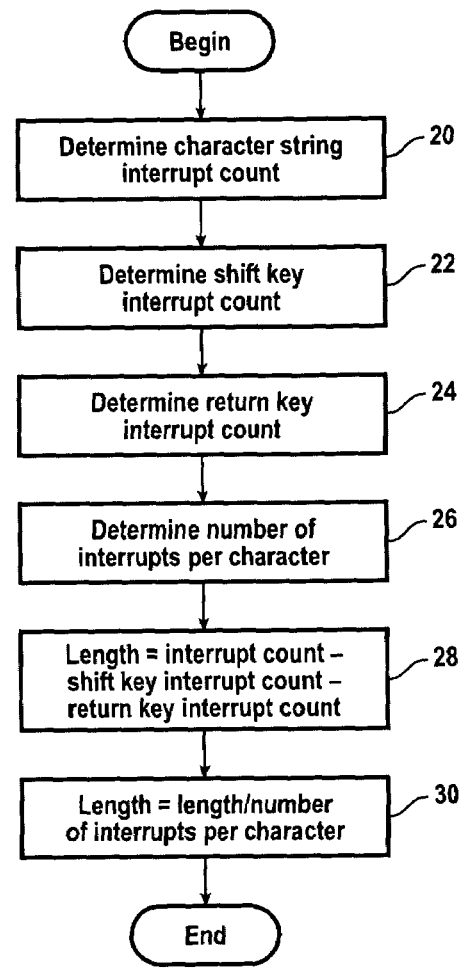
FIG. 2 is a flow diagram that illustrates a method for classifying characters within a character string in accordance with one embodiment of the present invention.

Turning now to FIG. 2, a method for classifying characters within a character string in accordance with one embodiment of the present invention is presented. This corresponds with reference numeral 13 of FIG. 1A. At reference numeral 20, a character string interrupt count is determined. At reference numeral 22, a "shift" key interrupt count is determined. At reference numeral 24, a "return" key interrupt count is determined. At reference numeral 26, the number of interrupts per character is determined. At reference numeral 28, the character string length is determined by subtracting the "shift" key interrupt count and the "return" key interrupt count from the character string interrupt count. At reference numeral 30, the character string length is divided by the number of interrupts per character.

The Second Timing Attack

According to another embodiment of the present invention, the keyspace of a character string such as a password is reduced by using a computer cache to determine which characters in the character string are timing equivalent to preceding characters. Characters that are timing equivalent are said to belong to the same timing equivalence class. To facilitate a better understanding of this embodiment of the present invention, an overview of a typical memory cache system will now be presented.

In order to increase performance, most modern computer systems include a memory cache chip. When the CPU reads a word of memory, the memory cache is checked to see if the word is in the cache. If the word is present, the CPU read is satisfied from the cache. If not, a block of main memory addresses is read into the cache and the word is then delivered to the CPU.

A common cache architecture is the direct mapped cache. Such a cache has a fixed number of slots s. Each slot holds a fixed number of bytes b. Main memory is divided into contiguous blocks of b bytes each. A main memory word with address a is mapped to slot number i by the formula i=a mod s.

Figure 3:
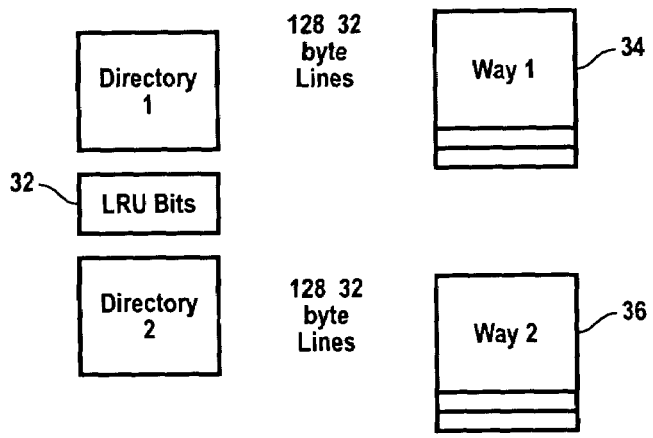
FIG. 3 is a block diagram that illustrates the Intel Pentium internal cache architecture.

Turning now to FIG. 3, a block diagram illustrating the Pentium internal cache architecture is presented. The timing experiments below were implemented on a Pentium PC. The Pentium has an 8-KB, 32-byte line, two way set associative L1 code cache, and an 8-KB, 32-byte line, two way set associative L1 data cache.

The L1 data cache has two ways 34, 36, each containing 128 32-byte lines (4,096 bytes). Main memory is divided into 1,048,576 4-KB pages each containing 128 32-byte lines. A read causes the containing line from a page to be brought into the corresponding line in the cache; the data cache least-recently-used (LRU) bit 32 for the line determines which way of the cache the line is read into. The system also has a 256-KB L2 cache that contains both code and data.

Figure 4:
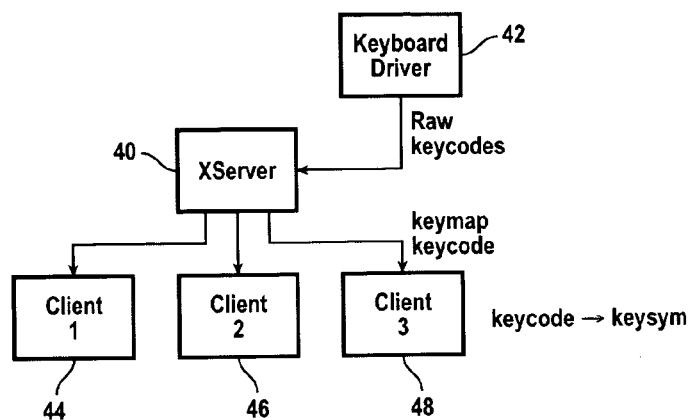
FIG. 4 is a block diagram that illustrates a timing attack on a X11 windowing system in accordance with one embodiment of the present invention.

Turning now to FIG. 4, the second timing attack is illustrated with respect to a test workstation running the X11 windowing system. The L1 and L2 cache on the workstation both have 32 byte lines. In the X11 windowing system, raw keycodes are delivered to the Xserver 40 by the keyboard driver 42. The Xserver 40 then sends the keycodes to the interested X11 clients 44, 46, 48 in keypress and keyrelease events. The clients 44, 46, 48 initially obtain the keymap (which is used to translate keycodes into keysyms) from the Xserver 40; the clients then translate the received keycodes into keysyms.

The X11 keymap contains elements that are involved with keyboard input processing. The basic idea of the attack is that when the user enters a keystroke, the keymap elements near that key are read into the memory data cache. On UNIX, the keymap can be viewed by typing the command "xmodmap-pk'. Each character and the corresponding upper case character use two bytes each in the keymap. Since a cache line (L1 and L2 ) holds 32 bytes, there are potentially as many, as eight keysyms that are brought into the cache at a time. The first timing attack can be used to pick out the upper case characters.

TABLE 5

| Time Between CPU Use (μsec) | Duration (μsec) | Description |
| --- | --- | --- |
| 149,858 | 122 | scheduling interrupt |
| 107,979 | 77 | key press interrupt |
| 1,826 | 2,804 | X11 key press event |
| 37,205 | 134 | scheduling interrupt |
| 80,471 | 83 | key release interrupt |
| 9,306 | 532 | X11 key release event |
| 59,475 | 130 | scheduling interrupt |
| 149,866 | 120 | scheduling interrupt |

Table 5 shows a typical timing output corresponding to a user entered keystroke. The first line in the table corresponds to a kernel scheduling routine that runs approximately every 150 milliseconds. The program is configured to report all CPU use that has a duration between 70 and 4,000 μsec.

According to one embodiment of the present invention, the attacker obtains information regarding characters in the users' password by timing the xlock client processing for each character in the password. The xlock client will access the keymap. Two password characters that are both brought into the same 32 byte line of the L1 and L2 caches by one read are timing equivalent. If two characters in the user password are equivalent, then the second character keypress event processing should take slightly less time than the first. Thus a correct guess at the first character reduces the size of the possible space for the second character to 3bits.

TABLE 6

| Experiment Group | Last Character Average Duration (μsec) |
| --- | --- |
| 1st 5 rpx's | 590.8 |
| 1st 5 rpo's | 579.4 |
| 1st 10 rpx's | 581.0 |
| 1st 10 rpo's | 582.3 |
| 1st 15 rpx's | 585.067 |
| 1st 15 rpo's | 579.867 |
| 1st 20 rpx's | 583.65 |
| 1st 20 rpo's | 577.35 |
| 1st 25 rpx's | 585.32 |
| 1st 25 rpo's | 574.44 |
| 1st 30 rpx's | 584.1 |
| 1st 30 rpo's | 572.833 |
| 1st 35 rpx's | 581.686 |
| 1st 35 rpo's | 572.629 |
| 1st 40 rpx's | 580.475 |
| 1st 40 rpo's | 572.175 |
| 1st 45 rpx's | 577.244 |
| 1st 45 rpo's | 568.577 |
| 1st 50 rpx's | 574.04 |
| 1st 50 rpo's | 566.46 |
| 1st 55 rpx's | 574.145 |
| 1st 55 rpo's | 565.727 |
| 1st 60 rpx's | 572.933 |
| 1st 60 rpo's | 565.483 |

Table 6 gives the results of the following experiment: The password "rpx" is typed and the attack program times the "x" character X11 processing (the line 3 column 2 value in Table 5). The password "rpo" is also typed in separate experiments, and the attack program times the "o" character X11 processing (the line 3 column 2 value in Table 5). The time duration of the processing associated with the "o" character is expected to be smaller, on average, than the time duration of the processing associated with the 'x' character. This difference is expected because the piece of the keymap that contains "o" should already be in one or both caches since either "r" or "p" should be timing equivalent to "o".

If "o" and "p" are timing equivalent, then the combination of the first and second timing attacks has reduced the strength of the password "rpo" from roughly 19.5 bits to 14 bits (19.5 =3*6.5; 6.5 bits per character are assumed as described above. For passwords that are chosen from a dictionary, the reduced strength will be less. The exact reduction in this later case will require a computation involving the words in the dictionary).

The reason why the third line of Table 5 corresponds to X11 key press event processing will now be explained. The X11 (server and client) must run to handle the key press events. No processes ran for longer duration. Thus, the only other duration that could be an X11 duration is line 2 of Table 5. In other words, the key press interrupt and X11 processing is contiguous. Durations in the range of 70-100 μsec are too small to include the interrupt, three context switches, the X server processing, and the X client processing.

Over the course of a long period on a UNIX system, these attempts can potentially reduce a user password to a strength of two to three bits or less per each character that is timing equivalent to a previous character in the password. The initial character of each timing equivalence class present in the password is reduced to 5.5 bits per character by the first timing attack. In all but the worst case (the worst case being that the password is from a dictionary or is short and infrequently changed, and the attacker combines the timing attacks with an online guessing attack), the attacker must follow up the timing attacks with an offline brute force attack against the network user authentication protocol password derived key.

The description of this embodiment with reference to the X11 windowing system is not intended to be limiting in any way. Those of ordinary skill in the art will recognize that the invention may be applied to other operating systems and scheduling systems as well.

Figure 5A:
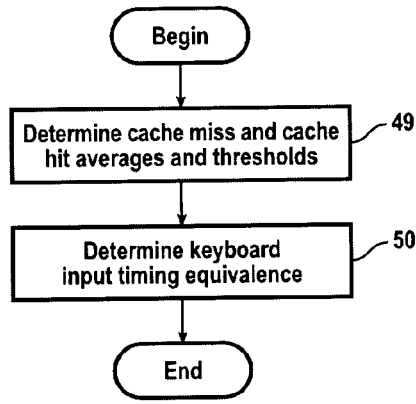
FIG. 5A is a flow diagram that illustrates a method for determining whether consecutively entered characters are from the same timing equivalence class in accordance with one embodiment of the present invention.

Turning now to FIG. 5A, a method for determining whether consecutively entered keyboard characters are from the same timing equivalence class is presented. At reference numeral 49, cache miss and cache hit averages and a threshold are determined. Character operations that result in cache hits are performed and an average is determined. Likewise, character operations that result in cache misses are performed and an average is taken. The two averages are used to establish a threshold duration that corresponds to reads of characters in the same equivalence class. At reference numeral 50, the timing equivalence of characters entered via a keyboard is determined by timing reads of the characters and comparing the results to the threshold established above. At least one trial is performed.

Figure 5B:
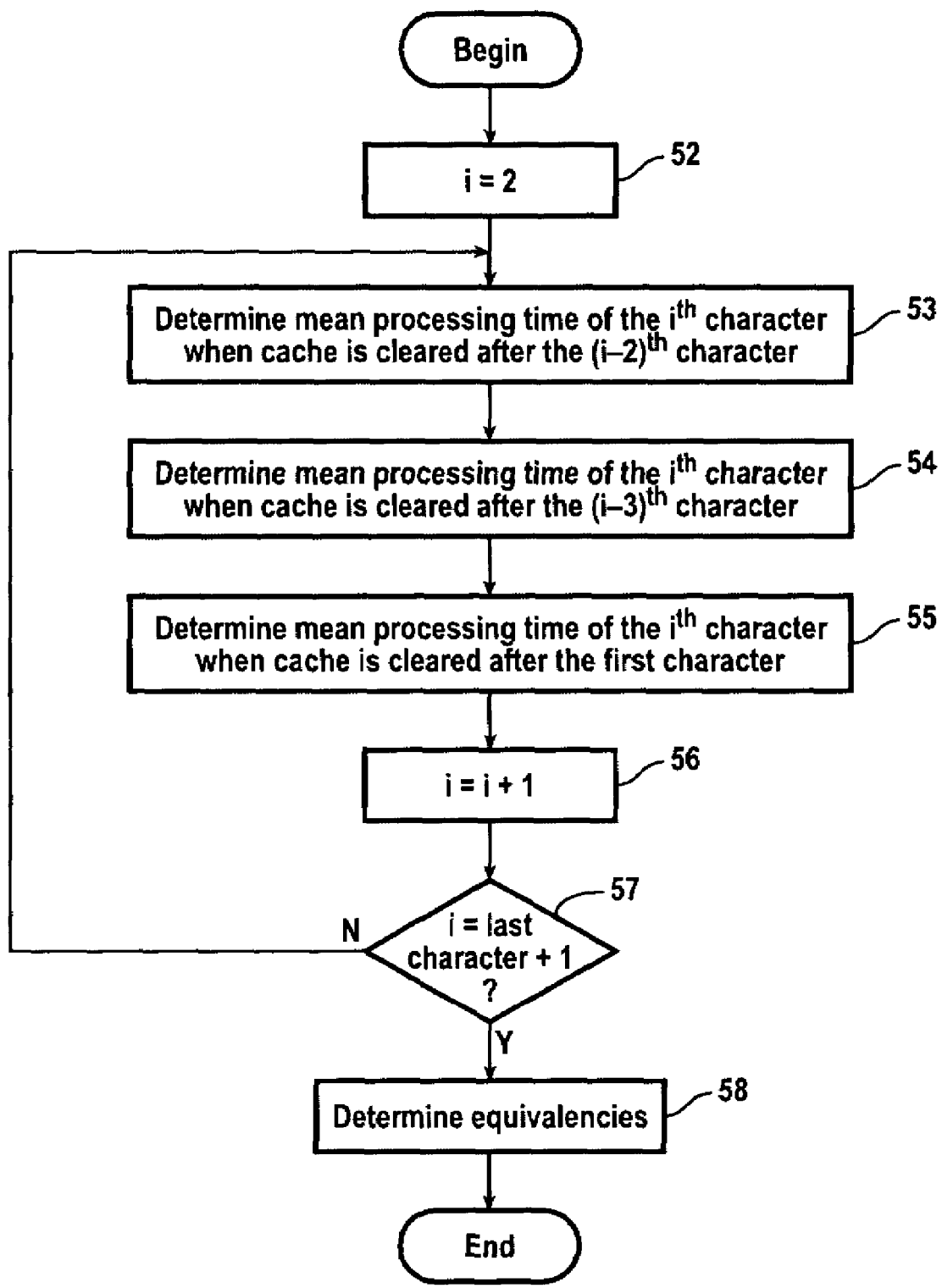
FIG. 5B is a flow diagram that illustrates a method for determining whether characters entered via a keyboard are from the same timing equivalence class in accordance with one embodiment of the present invention.

Turning now to FIG. 5B, a flow diagram that illustrates a method for determining whether characters entered via a keyboard are from the same timing equivalence class in accordance with one embodiment of the present invention is presented. This corresponds to reference numeral 50 of FIG. 5A. At reference numeral 52, a character to be timed is set to the second character in a character string. At reference numeral 53, a mean processing time for the character is determined. Cache is cleared after reading the character two character positions prior to the character to be timed. For example, if the character to be timed is character number four, cache is cleared after reading character number two. Multiple timing trials are performed to obtain a mean processing time.

At reference numeral 54, the mean processing time for the character is determined again, except that the cache is cleared one more position prior to the character to be timed. For example, if the character to be timed is character number four, cache is cleared after reading character number one. This process of determining mean processing times continues with cache being cleared after characters further towards the start of the character string are read until the start of the character string is reached, as indicated at reference numeral 55. At reference numeral 56, the next character is selected. At reference numeral 57, a check is made to determine whether any characters remain. If more characters remain, execution continues at reference numeral 53. If no characters remain, timing equivalencies are determined at reference numeral 58.

Timing equivalencies are determined by comparing the mean processing times with the threshold determined at reference numeral 49 of FIG. 5A. If the mean processing time is less than the threshold, it is timing equivalent If the mean processing time is greater than the threshold, it is not timing equivalent. For example, if the mean processing time of the $i^{th}$ character when cache is cleared after the $(i-3)^{th}$ character is less than the threshold, then the $i^{th}$ character is timing equivalent to the $(i-3)^{th}$ character. Conversely, if the mean processing time of the $i^{th}$ character when cache is cleared after the $(i-3)^{th}$ character is greater than the threshold, then the $i^{th}$ character is not timing equivalent to the $(i-3)^{th}$ character.

Those of ordinary skill in the art will recognize that the timing equivalencies could be determined immediately after determining the mean processing times at reference numerals 53, 54 and 55, rather than determining the equivalencies after all the mean processing times have been determined.

According to one embodiment of the present invention, the xlock client mean processing times for characters are determined at reference numerals 53, 54 and 55.

According to another embodiment of the present invention, the X Display Manager processing times for characters are determined at reference 53, 54 and 55.

According to yet another embodiment of the present invention, the pre-xinit/startx processing times for characters are determined at reference numerals 53, 54 and 55.

A timing attack against the xlock program has been demonstrated. There are two other cache timing attacks as well. The same attack can be carried out against the X Display Manager (xdm) program that handles the user's password during initial login. The benefit to the attacker is that there is a good chance that the timing equivalence classes will be different for xdm than for xlock. The attacker can use this information to reduce the bit value of the repeated equivalence class characters to less than three bits per character. If the user uses xinit/startx instead of xdm, then the initial login attack uses the kernel keycode map instead of the X keymap. Again, the attacker can use this information to reduce the bit value of the repeated equivalence class characters to less than three bits per character.

Each time the xlock program runs, it downloads the keymap from the X server. Thus, it is possible that the keymap is mapped to different locations in the cache on different occasions. This possibility may occur if for example, xlock creates a variable amount of data prior to downloading the keymap. Therefore, the timing equivalence classes could vary with each run of xlock. This is not expected to affect the results of the timing attacks. Either there are a few different cases that can be learned by the attacker, or the attacker can still derive information based on averages (most adjacent keys will always be equivalent, keys that are far away will never be equivalent, and keys that are in between will sometimes be equivalent). In a uniform distribution, it may be possible for the attacker to gain more information about password characters than in the constant equivalence class case. In the attack against xdm, the timing equivalence classes must stay constant between reboots of the system since xdm is a daemon.

Figure 6:
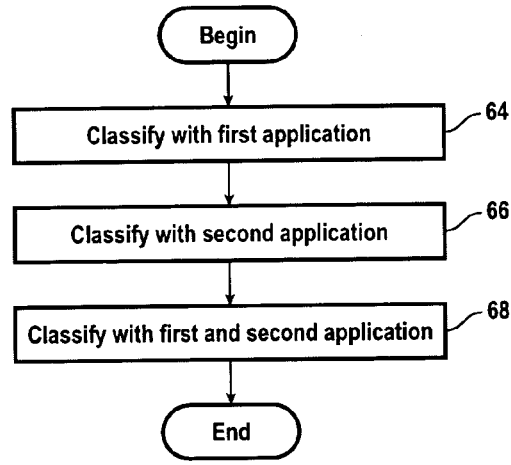
FIG. 6 is a flow diagram that illustrates a method for classifying characters within a character string in accordance with one embodiment of the present invention.

Turning now to FIG. 6, a method for classifying characters within a character string in accordance with the present invention is presented. The processing times for multiple character processing applications are used to further reduce the bit value of equivalence class characters. At reference numeral 64, multiple characters are classified according to the processing times for a first application. In an X11 windows system, the application could be any one which executes after the X program is started, such as xlock or xdm. Alternatively, the application may be one that runs before the X program is started. At reference numeral 66, the same characters are classified according to the processing times for a second application. The second application differs from the first application. At reference numeral 68, the characters are further classified according to the results of the first classification and the second classification.

For example, suppose there are two equivalence classes, named "A" and "B". Class A includes the characters "a", "b" and "c". Class B includes the characters "c", "d" and "e". These equivalence classes may contain overlapping data due to differences in the way key maps are cached for different character processing applications. Suppose the first classification, using the xlock application, determines a character is in class A. Suppose further that the second classification, using the xdm application, determines the same character is in class B. The character must be in a set consisting of the intersection between class A and B. In this example, the character must be "c".

TABLE 7

| Password Length (No. Characters) | Worst Case Strength (bits) | Best Case Strength (bits) |
| --- | --- | --- |
| 12 | 27 | 51 |
| 10 | 23 | 45 |
| 9 | 21 | 42 |
| 8 | 19 | 39 |
| 7 | 17 | 36 |

Table 7 shows the worst case and best case strength of passwords of various lengths under the combined timing attacks described above. For passwords that are in the six seven character range, the timing attacks may in the worst case reduce the key space to the point where online brute force attacks can obtain the password. Assuming two to three incorrect guesses are allowed per replicated server, this may give the attacker as many as ten to fifteen incorrect guesses per day (without locking up the victim's account). Thus the attacker can potentially search a twelve-bit key space in a year.

Therefore, most passwords can potentially be obtained by an attacker through the combination of timing attacks and brute force attacks on the network protocols. Note that the second timing attack requires many more trials than the first timing attack. at least fifteen to twenty trials may be required.

The timing attacks are probably not needed in the case that the user is entering his/her logon password into a non-trusted path password prompt. Examples are the UNIX su command, Windows 95, and entering the password into client applications. In these case, there are more direct windowing attacks that can be used.

The Third Timing Attack

The X window system avoids a potentially more serious timing attack, since each client performs its own keycode translation using its own copy of the keymap. In this case, security and performance both benefit from the same design decision. The attack will now be described.

In a windowing system where one process is responsible for keycode translation, the attacker can use the following strategy to attack the password. The attacker clears the cache after the second to last character of the password. Then only the equivalence class belonging to the last character of the password and the equivalence class of the return character will be in the cache at the time of the test. The attacker can test each of the equivalence classes to determine which class the last character is in by using an application that it controls to sample user keystrokes, since the keymap is shared by all processes.

When this equivalence class is determined, the attacker moves to the second to last character of the password by clearing the cache after the third to last character on each test. The attacker will either be able to determine that the second to last character belongs to one of the equivalence classes belonging to the last character or to the return character, or the attacker will obtain the equivalence class of the second to last character. In the first case, the attacker can then use the timing attack demonstrated above to determine which equivalence class the second to last character belongs to. Thus the attacker can potentially determine the equivalence class of each character in the password by proceeding in this manner. When combined with the multiple attacks above, this attack has the potential to reduce the strength of the password down to approximately two to three bits per character. Thus a twenty character or more password may be needed to obtain a key that has 56 bits worth of entropy. Most users may have difficulty remembering such long passwords.

Figure 7:
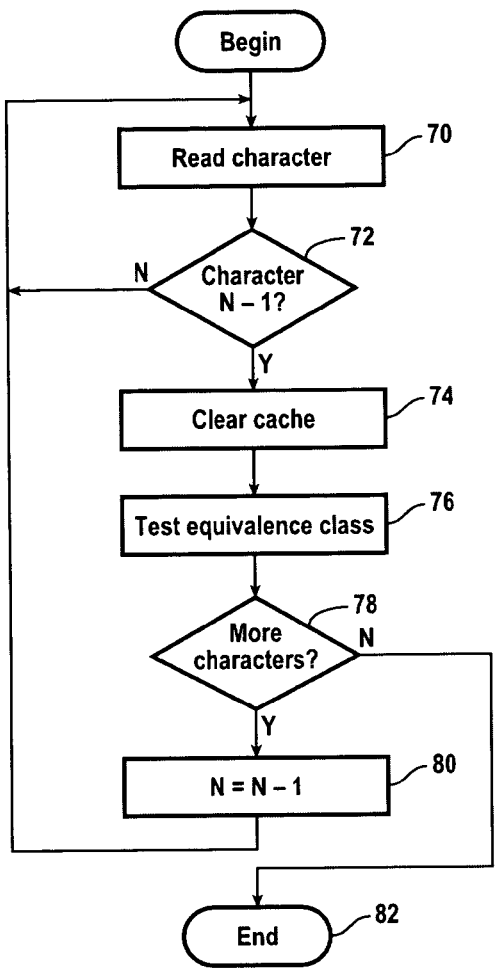
FIG. 7 is a flow diagram that illustrates a method for identifying the equivalence classes of consecutively entered keyboard characters in accordance with one embodiment of the present invention.

Turning now to FIG. 7, a method for identifying the equivalence class of consecutively entered keyboard characters in an n-character string is presented. At reference numeral 70, a character is read. At reference numeral 72, a check is made to determine whether the desired character is the next character to be read. At reference numeral 74, cache is cleared. At reference numeral 76, an equivalence class is tested. At reference numeral 78, a check is made to determine whether more characters remain. If more characters remain the next character is selected at reference numeral 80 and execution continues at reference numeral 70. If no more characters remain, execution terminates at reference numeral 82.

Figure 8:
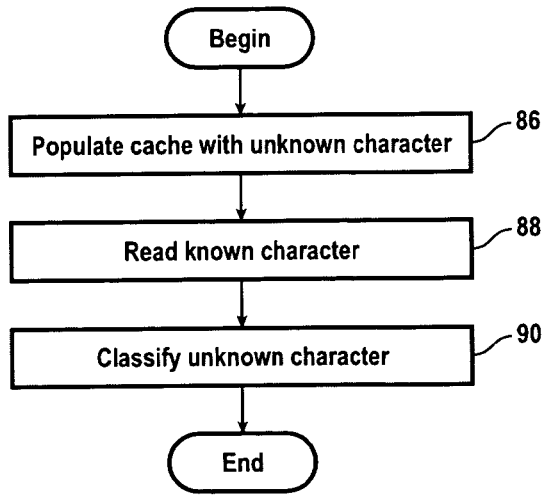
FIG. 8 is a flow diagram that illustrates a method for testing an equivalence class in accordance with one embodiment of the present invention.

Referring now to FIG. 8, a method for testing an equivalence class is presented. This corresponds to reference numeral 76 of FIG. 7. At reference numeral 86, cache is populated with a password character to be classified. At reference numeral 88, a character from a known equivalence class is read. At reference numeral 90, the password character is classified according to the interrupt information logged when the character was read. The interrupt information for a character in the same equivalence class will differ from the interrupt information for a character in a difference equivalent class.

Windows NT Attacks

The attacks described above have the potential to be successful on Windows NT. The main issue is how keycode translation is performed on Windows NT. On Windows NT, the keycode map is accessed in the Win32 process (the Windows NT equivalent of the X server); in other words, the keycode map is shared between all processes. Thus it is likely that the timing attacks described above will reduce the user password down to two to three bits per character which means that the attacks are potentially more effective against Windows NT.

The second attack may be more difficult on a Windows NT system, since the downloaded Trojan horse may not be able to survive the user logout (unless it modifies the user profile files or performs a similar trick). Unless the Trojan horse runs as an NT service, it will not be able to attack the user password input, and it will have to focus on the user input that occurs during an unlocking of the workstation.

Protecting Against Timing Attacks Fortunately, there are ways to protect against timing attacks against the trusted path mechanism. According to one embodiment of the present invention, long passwords (28 characters and longer) are employed. The characters are chosen to be spread out around the keyboard with at most one character within eight keys of the "1" (top left) key and at most one character within eight keys of the "/" (bottom right) character. Spreading out the characters in this fashion reduces susceptibility to the second timing attack described above by reducing the number of equivalence classes.

Figure 9:
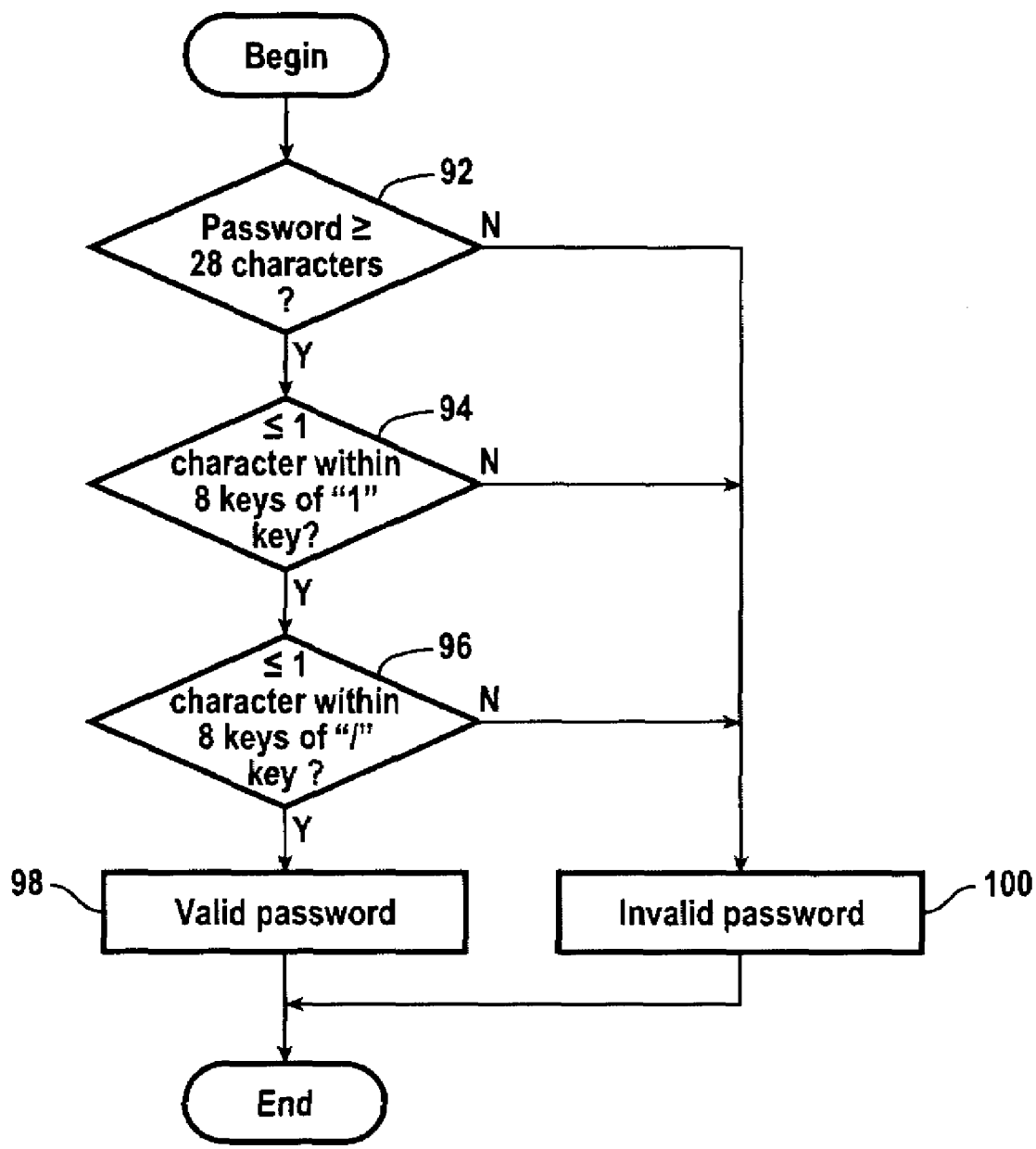
FIG. 9 is a flow diagram that illustrates a method for protecting against timing attacks against the trusted path mechanism in accordance with one embodiment of the present invention.

Turning now to FIG. 9, a flow diagram illustrating the above embodiment is presented. At reference numeral 92, the password length is checked. If the password length is less than 28 characters, it is invalid. At reference numeral 94, a check is made to determine whether one or more password characters are within eight keys of the number one "1" key. If so, the password is invalid. At reference numeral 96, a check is made to determine whether one or more password characters are within eight keys of the forward slash "/" key. If so, the password is invalid. Otherwise, a valid password is indicated at reference numeral 98.

This embodiment of the present invention can be implemented immediately and may be worthwhile for administrators who have good memories. If an administrator lacks a good memory, one solution is to write the password down and put it in secure location until the password is memorized. The administrator should then destroy the written copy.

According to another embodiment of the present invention, computer users must change their passwords at least every two months. Furthermore, a strict password policy is enforced. Users are prevented from choosing a password that is closely related to the old password. For example, the user might append a digit to the old password to obtain the new password. According to this embodiment, the user would be prevented from selecting such a new password.

According to another embodiment of the present invention, a computer system is configured for Trojan horse non-persistence and in the case of UNIX, rebooted often.

This solution only gives some protection against the second timing attack. The first timing attack can then be defeated by using passwords that are ten characters or longer (along with a good password policy).

According to another embodiment of the present invention, the trusted path mechanism implementation is modified to be a multithreaded process where one thread runs at a high priority and executes a loop that consume the CPU resources. The purpose of this thread is to prevent any timing Trojan horses from running.

According to another embodiment of the present invention, the computer system employed is a UNIX computer system, and the scheduling system is modified such that processes that voluntarily relinquish the CPU are not assigned a higher priority. This prevents unprivileged processes from obtaining a higher priority than the privileged process that consumes the CPU resources. An operating system with a scheduling algorithm according to this embodiment can prevent the first timing attack and the version of the second timing attack where inter-character timings are used within the password.

Figure 10:
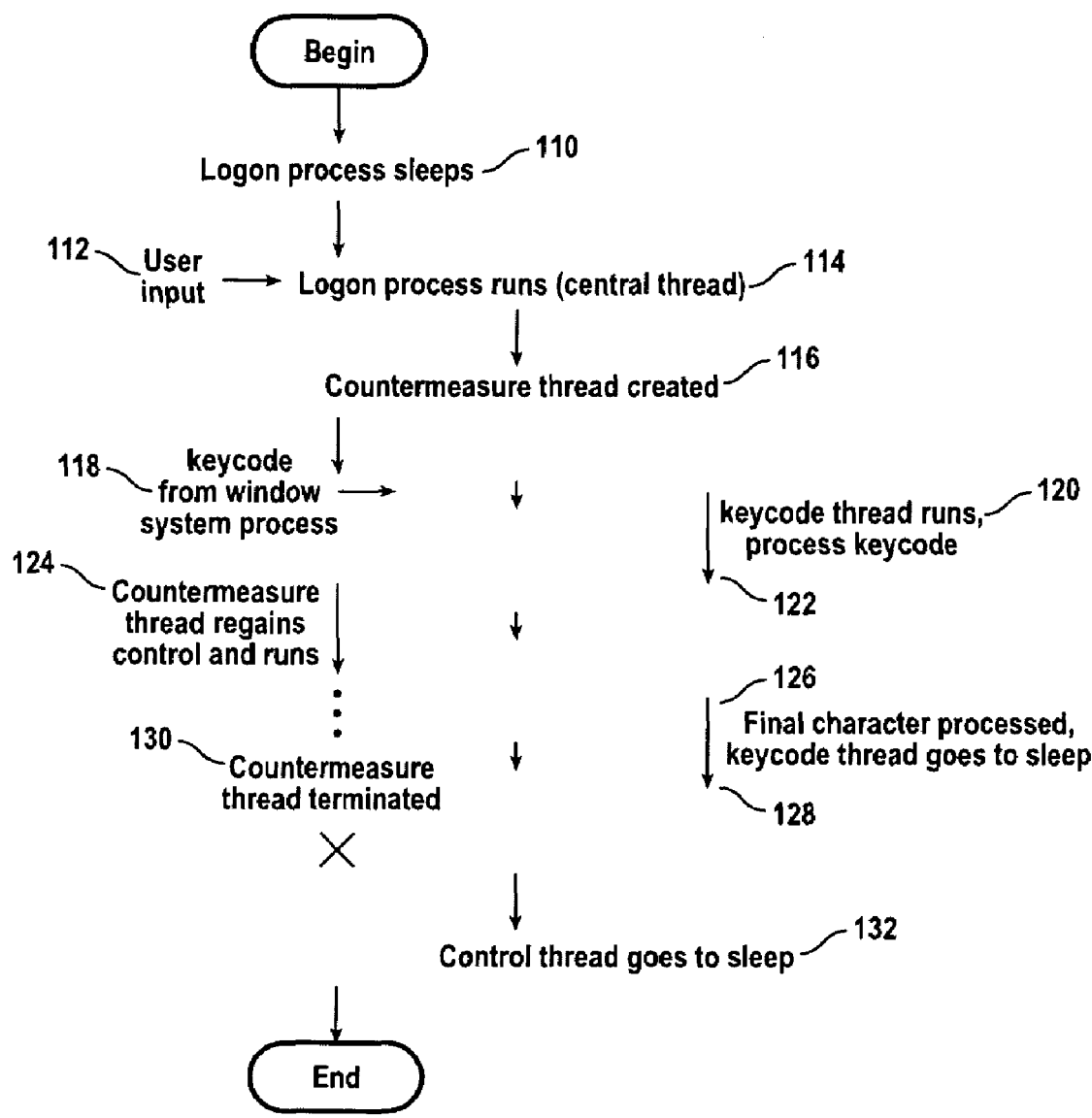
FIG. 10 is a flow diagram that illustrates a method for protecting against timing attacks against the trusted path mechanism in accordance with one embodiment of the present invention.

Turning now to FIG. 10, a flow diagram illustrating one embodiment of the present invention is presented. At reference numeral 110, a logon process sleeps, awaiting user input from a keyboard. At reference numeral 112, the user begins logging on, awakening the logon process. At reference numeral 114, the control thread of the logon process resumes execution. At reference numeral 116, the control thread creates a countermeasure thread, which executes at a relatively high priority to prevent execution of a Trojan horse application. At reference numeral 118, a key code is received from a Window System process. At reference numeral 120, the control thread resumes execution of a keycode thread. At reference numeral 122, the keycode thread completes processing the character and the .keycode thread goes to sleep. At reference numeral 124, the control thread resumes execution of the countermeasure thread, which continues to execute until another keycode is received. At reference numeral 126, the last keycode is processed by the keycode thread. At reference numeral 128 the keycode thread goes to sleep. At reference numeral 130, the control thread terminates the countermeasure thread. At reference numeral 132, the control thread goes to sleep and awaits user input once again.

According to another embodiment of the present invention, the trusted path implementation also clears the L1 and L2 caches before completing. An operating system according to this embodiment will prevent the versions of the second timing attack that result on systems that have a shared keymap table.

According to another embodiment of the present invention, a network user authentication protocol, or something similar (involving some sort of public key algorithm) is employed. These protocols are not vulnerable to offline brute force attacks. There are performance considerations here. A strong password policy that includes a mandatory minimum length of eight or nine characters for passwords should still be used, else the timing attacks described here can be combined with online attacks against user passwords. In other words, the timing attacks may reduce the dictionary possibilities to a small enough number so that online brute force attacks are practical even with normal restrictions (e.g., three failed attempts locks up the account).

According to another embodiment of the present invention, tamper proof smart cards that contain the user's private keys are issued to all computer users. A user's private key is kept encrypted in the user's password. If the user enters a password into the workstation, then trusted path is still needed on the user workstations.

The security of user systems is gaining more importance with the advent of downloadable user executable content. The trusted path mechanism protects user passwords from being handed to untrusted software. According to the present invention, timing attacks may be used against the trusted path mechanism to leak password bits. The first timing attack requires only a few trials to complete its work; it obtains the length of the user password and reduces the bit strength of the password by length bits. The second timing attack requires more trials; it needs at least fifteen to twenty trials to obtain any leakage, but over the course of a long period can potentially reduce the user password to a strength of two to three bits per character plus 5.5 bits for each of the distinct timing equivalence classes present.

These attacks must be combined with brute force attacks against the remainder of the key space. The significance of these attacks is that a strong password policy, although still worthwhile, is not sufficient; it should be combined with user authentication protocols that are resistant to offline brute force attacks against the password, and a modified trusted path implementation that is resistant to these timing attacks.

The present invention provides a method for determining the length of a character string entered via a keyboard on a computer system. It also provides a method for determining the equivalence class of characters within a character string entered via a keyboard on a computer system. In addition, the present invention provides a method for protecting against timing attacks on a computer system to leak password bits.

According to a presently preferred embodiment, the present invention may be implemented in software or firmware, as well as in programmable gate array devices, Application Specific Integrated Circuits (ASICs), and other hardware.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for protecting against timing attacks a trusted path mechanism, comprising:

modifying, by a computer system, a trusted path mechanism implementation to be a multithreaded process comprising a first thread to prevent any timing Trojan horses from running, the first thread running in a loop at a high priority relative to the timing Trojan horse;

wherein modifying the trusted oath mechanism implementation to be a multithreaded process comprises modifying a control thread, the control thread operable to provide a communication oath between an input device and an operating system, to include the first thread configured to execute the high priority relative to the timing Trojan horse in response to an absence of an input from the input device and a second thread configured to execute in response to receipt of an input from the input device, the first thread and the second thread being operable to run in a substantially consecutive manner, the first thread being operable to run in a loop at the high priority relative to the timing Trojan horse to prevent the timing Trojan horses from running;

receiving, by the control thread, a first input from the input device, the first input representing a first character of a keycode;

creating, by the control thread, the first thread in response to receiving the first input;

initiating, by the control thread, execution of the second thread to process the first input received from the input device;

detecting completion of processing of the first input from the input device by the second thread; and in response to completion of the processing of the first input from the input device, discontinuing, by the control thread, execution of the second thread and initiating execution of the first thread in a loop at the high priority relative to the timing Trojan horse to prevent the timing Trojan horses from running.

2. The method according to claim 1, the method further comprising:

clearing, by the computer system, cache before completing the trusted path mechanism.

3. A method for protecting against timing attacks a trusted path mechanism, comprising:

employing, by a computer system, a multithreaded process executing on a CPU of the computer system, the multithreaded process comprising a first thread to prevent any timing Trojan horses from running;

running, by the computer system, the first thread in a loop at a first priority; and prohibiting, by the computer system, unprivileged processes from obtaining a priority higher than the first priority;

wherein employing a multithreaded process executing on the CPU of the computer system comprises employing a control thread, the control thread operable to provide a communication path between an input device and an operating system, the control thread including the first thread configured to execute the high priority relative to the timing Trojan horse in response to an absence of an input from the input device and a second thread configured to execute in response to receipt of an input from the input device, the first thread and the second thread being operable to run in a substantially consecutive manner, the first thread being operable to run in a loop at the high priority relative to the timing Trojan horse to prevent the timing Trojan horses from running.

4. The method according to claim 3, the method further comprising:

clearing, by the computer system, cache before completing the trusted path mechanism.

5. A program storage device readable by a machine, tangibly embodying a program of instructions executable by the machine to protect against timing attacks a trusted path mechanism, comprising:

a first module comprising code for causing a machine to modify a trusted path mechanism implementation to be a multithreaded process comprising a first thread to prevent any timing Trojan horses from running, the first thread running in a loop at a high priority relative to the timing Trojan horse;

wherein when modifying the trusted path mechanism implementation to be a multithreaded process, the first module is configured to modify a control thread, the control thread operable to provide a communication path between an input device and an operating system, to include the first thread configured to execute the high priority relative to the timing Trojan horse in response to an absence of an input from the input device and a second thread configured to execute in response to receipt of an input from the input device, the first thread and the second thread being operable to run in a substantially consecutive manner, the first thread being operable to run in a loop at the high priority relative to the timing Trojan horse to prevent the timing Trojan horses from running;

receiving, by the control thread, a first input from the input device, the first input representing a first character of a keycode;

creating, by the control thread, the first thread in response to receiving the first input;

initiating by the control thread, execution of the second thread to process the first input received from the input device;

detecting completion of processing of the first input from the input device by the second thread; and in response to completion of the processing of the first input from the input device, discontinuing, by the control thread, execution of the second thread and initiating execution of the first thread in a loop at a high priority relative to the timing Trojan horse to prevent the timing Trojan horses from running.

6. An apparatus for protecting against timing attacks a trusted path mechanism, comprising:

means for modifying a trusted path mechanism implementation to be a multithreaded process comprising a first thread to prevent any timing Trojan horses from running, the first thread running in a loop at a high priority relative to the timing Trojan horse;

wherein means for modifying the trusted path mechanism implementation to be a multithreaded process comprises means for modifying a control thread, the control thread operable to provide a communication path between an input device and an operating system, to include the first thread configured to execute the high priority relative to the timing Trojan horse in response to an absence of an input from the input device and a second thread configured to execute in response to receipt of an input from the input device, the first thread and the second thread being operable to run in a substantially consecutive manner, the first thread being operable to run in a loop at the high priority relative to the timing Trojan horse to prevent the timing Trojan horses from running;

means for receiving, by the control thread, a first input from the input device, the first input representing a first character of a keycode;

means for creating, by the control thread, the first thread in response to receiving the first input;

means for initiating, by the control thread, execution of the second thread to process the first input received from the input device;

means for detecting completion of processing of the first input from the input device by the second thread; and in response to completion of the processing of the first input from the input device, means for discontinuing, by the control thread, execution of the second thread and initiating execution of the first thread in a loon at the high priority relative to the timing Trojan horse to prevent the timing Trojan horses from running.

7. A computer system for protecting against timing attacks a trusted path mechanism, the computer system comprising:

a cache; and a CPU adapted to execute a trusted path multithreaded process comprising a first thread to prevent any timing Trojan horses from running, the first thread adapted to run in a loop at a high priority relative to the timing Trojan horse;

the CPU further configured to modify the trusted oath multithreaded process comprises, when modifying, the CPU configured to modify a control thread, the control thread operable to provide a communication oath between an input device and an operating system, to include the first thread configured to execute the high priority relative to the timing Trojan horse in response to an absence of an input from the input device and a second thread configured to execute in response to receipt of an input from the input device, the first thread and the second thread being operable to run in a substantially consecutive manner, the first thread being operable to run in a loop at the high priority relative to the timing Trojan horse to prevent the timing Trojan horses from running;

receiving, by the control thread, a first input from the input device, the first input representing a first character of a keycode;

creating, by the control thread, the first thread in response to receiving the first input;

initiating, by the control thread, execution of the second thread to process the first input received from the input device;

detecting completion of processing of the first input from the input device by the second thread; and in response to completion of the processing of the first input from the input device, discontinuing, by the control thread, execution of the second thread and initiating execution of the first thread in a loon at the high priority relative to the timing Trojan horse to prevent the timing Trojan horses from running.

8. The computer system of claim 7, wherein the CPU is further adapted to clear the cache before completing the trusted path multithreaded process.

9. A computer system for protecting against timing attacks a trusted path mechanism, the computer system comprising:

a cache; and a CPU for executing a multithreaded process comprising a first thread to prevent any timing Trojan horses from running, the CPU further adapted to run the first thread in a loop at a first priority, and prohibit unprivileged processes from obtaining a priority higher than the first priority;

wherein, when executing a multithreaded process, the CPU is configured to employ a control thread, the control thread operable to provide a communication path between an input device and an operating system, the control thread including the first thread configured to execute the high priority relative to the timing Trojan horse in response to an absence of an input from the input device and a second thread configured to execute in response to receipt of an input from the input device, the first thread and the second thread being operable to run in a substantially consecutive manner, the first thread being operable to run in a loop at the high priority relative to the timing Trojan horse to prevent the timing Trojan horses from running.

10. The computer system of claim 9, the CPU further adapted to clear the cache before completing the trusted path multithreaded process.

11. The method of claim 1, comprising:
receiving, by the control thread, a second input from the input device, the second input representing a second character of the keycode;
discontinuing, by the control thread, execution of the first thread and initiating execution of the second thread to process the second input received from the input device;
detecting completion of processing of the second input from the input device by the second thread; and
in response to completion of the processing of the second input from the input device, discontinuing, by the control thread, execution of the second thread and initiating execution of the first thread in a loop at a high priority relative to the timing Trojan horse to prevent a timing Trojan horses from running.

12. The method of claim 11, wherein:
receiving, by the control thread, the second input from the input device comprises receiving, by the control thread, a final input from the input device, the final input representing a final character of the keycode;
discontinuing, by the control thread, execution of the first thread and initiating execution of the second thread comprises discontinuing, by the control thread, execution of the first thread and initiating execution of the second thread to process the final input received from the input device;
detecting completion of processing of the second input from the input device by the second thread comprises detecting completion of processing of the final input from the input device by the second thread; and
in response to completion of the processing of the second input from the input device, discontinuing, by the control thread, execution of the second thread and maintaining non-execution of the first thread.

13. The method of claim 1, comprising:
detecting the first thread as a privileged process;
assigning the first thread, as a privileged process, a higher priority than an unprivileged process;
detecting the timing Trojan horse as an unprivileged process; and
in response to the higher priority of the first thread, executing the first thread to limit execution of the timing Trojan horse.

14. The method of claim 3, wherein running the first thread in a loop at the first priority comprises:
receiving, by the control thread, a first input from the input device, the first input representing a first character of a keycode;
creating, by the control thread, the first thread in response to receiving the first input;
initiating, by the control thread, execution of the second thread to process the first input received from the input device;
detecting completion of processing of the first input from the input device by the second thread; and
in response to completion of the processing of the first input from the input device, discontinuing, by the control thread, execution of the second thread and initiating execution of the first thread in a loop at the first priority to prevent a timing Trojan horses from running, the first priority being higher than a priority associated with any timing Trojan horse.

15. The method of claim 14, comprising:
receiving, by the control thread, a second input from the input device, the second input representing a second character of the keycode;
discontinuing, by the control thread, execution of the first thread and initiating execution of the second thread to process the second input received from the input device;
detecting completion of processing of the second input from the input device by the second thread; and
in response to completion of the processing of the second input from the input device, discontinuing, by the control thread, execution of the second thread and initiating execution of the first thread in a loop at a high priority relative to the timing Trojan horse to prevent the timing Trojan horses from running.

16. The method of claim 15, wherein:
receiving, by the control thread, the second input from the input device comprises receiving, by the control thread, a final input from the input device, the final input representing a final character of the keycode;
discontinuing, by the control thread, execution of the first thread and initiating execution of the second thread comprises discontinuing, by the control thread, execution of the first thread and initiating execution of the second thread to process the final input received from the input device;
detecting completion of processing of the second input from the input device by the second thread comprises detecting completion of processing of the final input from the input device by the second thread; and
in response to completion of the processing of the second input from the input device, discontinuing, by the control thread, execution of the second thread and maintaining non-execution of the first thread.

17. The method of claim 3, wherein prohibiting unprivileged processes from obtaining a priority higher than the first priority comprises:
detecting the first thread as a privileged process;
assigning the first thread, as a privileged process, a higher priority than an unprivileged process;
detecting the timing Trojan horse as an unprivileged process; and
in response to the higher priority of the first thread, executing the first thread to limit execution of the timing Trojan horse.

18. The method of claim 1, wherein the first thread being operable to run in a loop at the high priority relative to the timing Trojan horse to prevent the timing Trojan horses from running comprises the first thread being operable to run in a loop at the high priority relative to the timing Trojan horse to consume computer system resources to prevent the timing Trojan horses from running.

* * * * *

UNITED STATES PATENT AND TRADEMARK OFFICE
CERTIFICATE OF CORRECTION

PATENT NO. : 7,644,439 B2
APPLICATION NO. : 10/937079
DATED : January 5, 2010
INVENTOR(S) : Jonathan T. Trostle It is certified that error appears in the above-identified patent and that said Letters Patent is hereby corrected as shown below:

Claim 1, Column 16, Lines 4-7, "wherein modifying the trusted oath mechanism implementation to be a multithreaded process comprises modifying a control thread, the control thread operable to provide a communication oath between an input device and" should read --wherein modifying the trusted path mechanism implementation to be a multithreaded process comprises modifying a control thread, the control thread operable to provide a communication path between an input device and--.

Claim 7, Column 18, Lines 20-23, "the CPU further configured to modify the trusted oath multithreaded process comprises, when modifying, the CPU configured to modify a control thread, the control thread operable to provide a communication oath" should read --the CPU further configured to modify the trusted path multithreaded process comprises, when modifying, the CPU configured to modify a control thread, the control thread operable to provide a communication path--.

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,644,439 B2
APPLICATION NO. : 10/937079
DATED : January 5, 2010
INVENTOR(S) : Jonathan T. Trostle It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1485 days.

Signed and Sealed this

Twenty-first Day of December, 2010

David J. Kappos
*Director of the United States Patent and Trademark Office*